United States Patent
Takemura et al.

(10) Patent No.: US 9,933,661 B2
(45) Date of Patent: Apr. 3, 2018

(54) LIQUID CRYSTAL APPARATUS AND ELECTRONIC APPARATUS

(71) Applicant: Seiko Epson Corporation, Tokyo (JP)

(72) Inventors: Koichi Takemura, Chino (JP); Shohei Yoshida, Shimosuwa-machi (JP); Toshiyuki Noguchi, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 189 days.

(21) Appl. No.: 15/084,456

(22) Filed: Mar. 29, 2016

(65) Prior Publication Data

US 2016/0299367 A1 Oct. 13, 2016

(30) Foreign Application Priority Data

Apr. 13, 2015 (JP) ................. 2015-081651

(51) Int. Cl.
*G02F 1/1335* (2006.01)
*G02F 1/1337* (2006.01)
*G02F 1/137* (2006.01)

(52) U.S. Cl.
CPC .. *G02F 1/133719* (2013.01); *G02F 1/133734* (2013.01); *G02F 2001/13712* (2013.01); *G02F 2001/133742* (2013.01)

(58) Field of Classification Search
CPC .......... G02F 2001/13712; G02F 2001/133742
USPC ....................................... 349/123
See application file for complete search history.

(56) References Cited

U.S. PATENT DOCUMENTS

| | | | |
|---|---|---|---|
| 2005/0052600 A1 | 3/2005 | Hashimoto et al. | |
| 2005/0146665 A1* | 7/2005 | Tanaka | G02F 1/133734 349/134 |
| 2014/0078411 A1* | 3/2014 | Takemura | G02F 1/1337 349/5 |

FOREIGN PATENT DOCUMENTS

| | | | |
|---|---|---|---|
| JP | 2003165175 | * | 10/2003 |
| JP | 2005-070530 A | | 3/2005 |
| JP | 2005-181794 A | | 7/2005 |
| JP | 3760444 B | | 3/2006 |

\* cited by examiner

*Primary Examiner* — Hoan C Nguyen
(74) *Attorney, Agent, or Firm* — ALG Intellectual Property, LLC

(57) ABSTRACT

A liquid crystal apparatus includes a substrate that includes a convex portion on one surface, a liquid crystal layer that is arranged on the one surface side of the substrate, an inorganic alignment film that is arranged between the substrate and the liquid crystal layer, and has a column structure inclined to the one surface of the substrate, and an organic alignment film, in which the inorganic alignment film has a concave portion of which a thickness becomes thin in at least a portion of the column structure, at a position to be in contact with a portion that does not face an inclined direction side of the column structure in a side surface of the convex portion, and the organic alignment film is arranged in the concave portion.

18 Claims, 8 Drawing Sheets

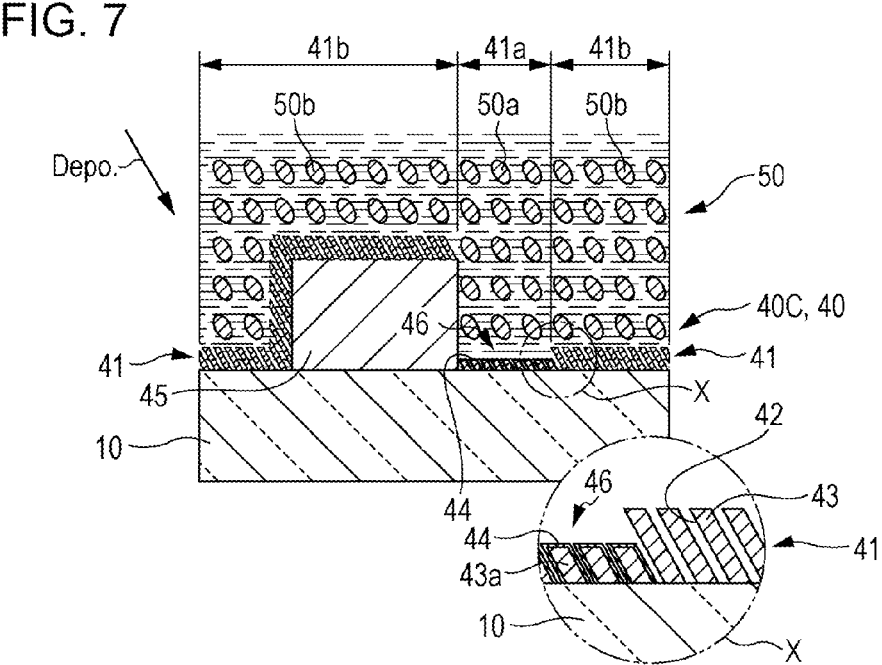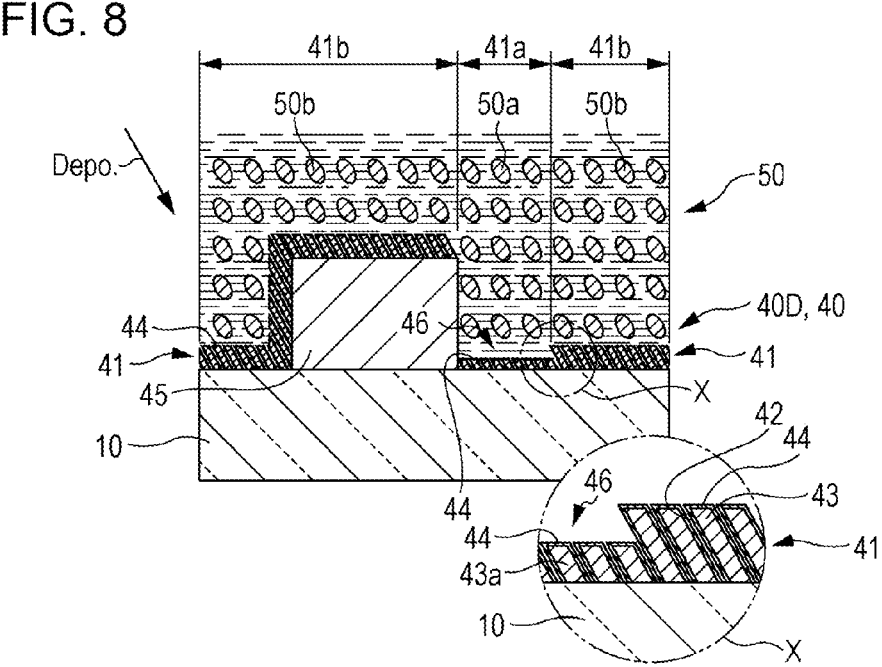

LIQUID CRYSTAL APPARATUS AND ELECTRONIC APPARATUS

BACKGROUND

1. Technical Field

The present disclosure relates to a liquid crystal apparatus, and an electronic apparatus.

2. Related Art

In recent years, in a liquid crystal display element (liquid crystal apparatus) for a display purpose, it is preferable that a light resistance lifespan is improved along with a spread of a digital signage (electronic signboard) purpose. In order to solve such a problem, it is effective to use an alignment film (hereinafter referred to as an inorganic alignment film) which is made up of an inorganic material, in place of an alignment film (hereinafter referred to as an organic alignment film) which is made up of an organic material.

However, if the inorganic alignment film is used, there is one side that a large number of polarized hydroxyl groups are present on a surface of the inorganic alignment film, or adhesion to a sealing material of a surface having a porous shape becomes low, and as a result, moisture-proof properties become low. Therefore, from the viewpoint of enhancement of the moisture-proof properties with the improvement of the light resistance lifespan, a hybrid type alignment film which is made up of the inorganic alignment film and the organic alignment film is proposed (for example, see Japanese Patent No. 3760444, JP-A-2005-70530, or JP-A-2005-181794).

Incidentally, a surface (surface of a side facing a liquid crystal layer) on which the alignment film is formed is not equally flat, and for example, various step portions (convex portions) such as a step between pillar-shaped spacers, a step between pixel electrodes, and a step by wiring are present. In case where the inorganic alignment film is formed by oblique vapor deposition, for example, an inorganic oxide such as $SiO_2$ is vaporized and deposited in a direction that is oblique to the surface on which the step portion is arranged. Therefore, in a portion which becomes a shadow portion of the step portion to the vapor deposition direction, a situation where the inorganic oxide is unlikely to be vaporized and deposited occurs. As a result, a portion (concave portion) where a thickness of the inorganic alignment film is relatively reduced is formed in the vicinity of the step portion.

In such a portion (concave portion) which becomes the shadow portion of the step portion (convex portion), a column density of the inorganic alignment film or the thickness of the film is different from that of a portion where the inorganic alignment film is normally formed with a uniform thickness. Accordingly, in the portion which becomes the shadow portion of the step portion, a pre-tilt angle or an alignment direction of liquid crystal molecules is changed, or an alignment state of the liquid crystal layer becomes unstable. As a result, for example, degradation of display quality such as disclination or light leakage (black floating) is caused.

As a countermeasure against the degradation of the display quality, in the liquid crystal apparatus of the related art, the above-described portion which becomes the shadow portion of the step portion is arranged on an outside of a pixel or is concealed by a light-shielding film. However, in the countermeasure of the related art, an opening ratio is greatly lowered during the situation where high definition advances.

SUMMARY

An advantage of some embodiments are to provide a liquid crystal apparatus which is excellent in moisture-proof properties and alignment stability while achieving further improvement of a light resistance lifespan, a method for manufacturing the same, and an electronic apparatus.

According to an aspect of the embodiment, there is provided a liquid crystal apparatus including a substrate that includes a convex portion on one surface, a liquid crystal layer that is arranged on the one surface side of the substrate, an inorganic alignment film that is arranged between the substrate and the liquid crystal layer, and has a column structure inclined to the one surface of the substrate, and an organic alignment film, in which the inorganic alignment film has a concave portion of which a thickness becomes thin in at least a portion of the column structure, the concave portion is arranged at a position to be in contact with a portion that does not face an inclined direction side of the column structure in a side surface of the convex portion, and the organic alignment film is arranged in the concave portion.

According to the configuration, since an alignment state of the liquid crystal layer is stabilized by the organic alignment film arranged in at least the concave portion, it is possible to obtain excellent moisture-proof properties and alignment stability while achieving further improvement of the light resistance lifespan.

In the liquid crystal apparatus, a thickness of the organic alignment film may be a thickness such that an alignment state of the liquid crystal layer at the concave portion becomes an alignment state that is different from the alignment state of the liquid crystal layer at a position which is different from the concave portion.

According to the configuration, by making the thickness of the organic alignment film arranged in the concave portion sufficiently thick, it is possible to make the alignment state of the liquid crystal layer that is allowed by the organic alignment film arranged in the concave portion be different from the alignment state of the liquid crystal layer that is allowed by the inorganic alignment film.

In the liquid crystal apparatus, a thickness of the organic alignment film may be a thickness such that an alignment state of the liquid crystal layer at the concave portion becomes an alignment state that is the same as the alignment state of the liquid crystal layer at a position which is different from the concave portion.

According to the configuration, by making the thickness of the organic alignment film arranged in the concave portion sufficiently thin, it is possible to make the alignment state of the liquid crystal layer that is allowed by the organic alignment film arranged in the concave portion be the same (uniform) as the alignment state of the liquid crystal layer that is allowed by the inorganic alignment film.

In the liquid crystal apparatus, the organic alignment film may have a portion arranged in the concave portion, and a portion arranged in a position which is different from the concave portion.

According to the configuration, by making the thickness of the organic alignment film arranged in the position which is different from the concave portion sufficiently thin, it is possible to make the alignment state of the liquid crystal layer that is allowed by the organic alignment film arranged in the position which is different from the concave portion be the same (uniform) as the alignment state of the liquid crystal layer that is allowed by the inorganic alignment film.

In the liquid crystal apparatus, the organic alignment film may be an organic silane compound.

According to the configuration, it is possible to obtain excellent moisture-proof properties and alignment stability while achieving further improvement of the light resistance lifespan.

According to another aspect of the embodiment, there is provided an electronic apparatus including any of the liquid crystal apparatuses described above.

According to the configuration, it is possible to provide the electronic apparatus including the liquid crystal apparatus which is excellent in moisture-proof properties and alignment stability while achieving further improvement of the light resistance lifespan.

BRIEF DESCRIPTION OF THE DRAWINGS

The disclosure will be described with reference to the accompanying drawings, wherein like numbers reference like elements.

FIG. 7 is a sectional view schematically illustrating a structure of an alignment layer according to a third embodiment or a seventh embodiment.

FIG. 8 is a sectional view schematically illustrating a structure of an alignment layer according to a fourth embodiment or an eighth embodiment.

DESCRIPTION OF EXEMPLARY EMBODIMENTS

Figure 1:
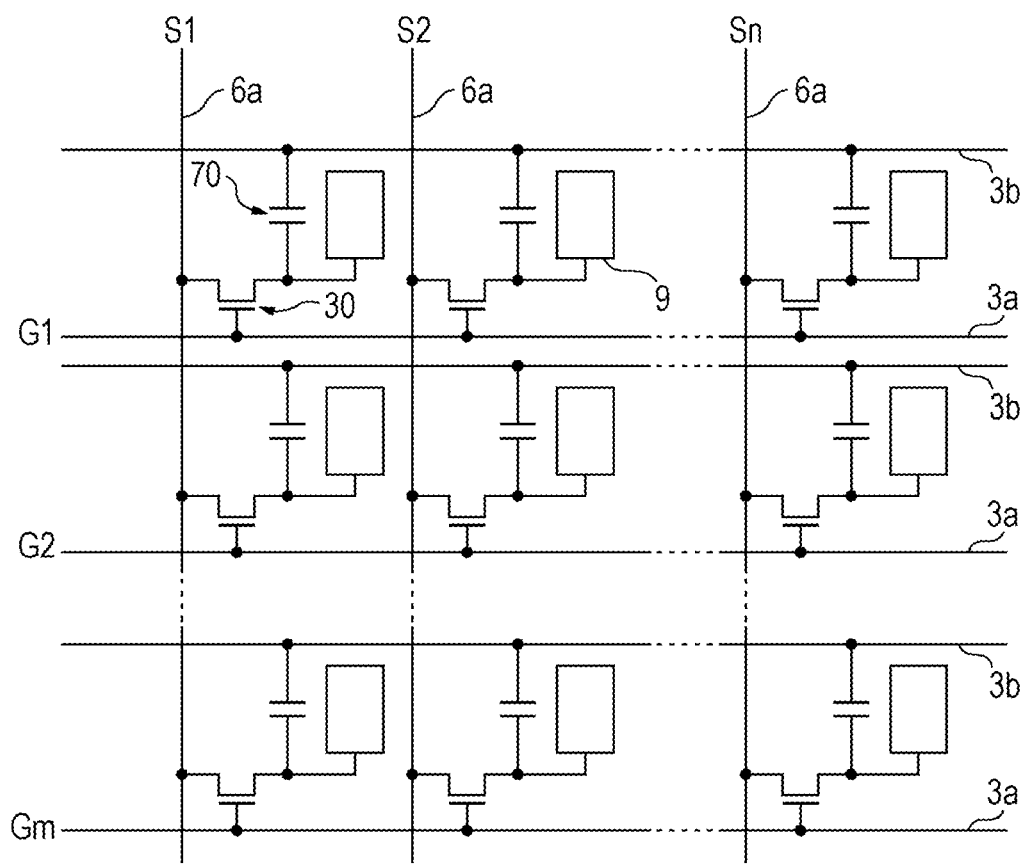
FIG. 1 is an equivalent circuit diagram illustrating an element structure of a liquid crystal apparatus according to one embodiment.

Hereinafter, some embodiments will be described with reference to the drawings. In each of the drawings, in order to make each layer and each member have sizes of recognizable degrees in the drawings, scales per each layer and each member are made to be different from each other.

Liquid Crystal Apparatus

First, a liquid crystal apparatus according to one embodiment will be described with reference to FIG. 1 to FIG. 4.

The liquid crystal apparatus of the embodiment is a transmission type liquid crystal apparatus of an active matrix system which uses a thin-film transistor (TFT) element as a switching element.

Figure 2:
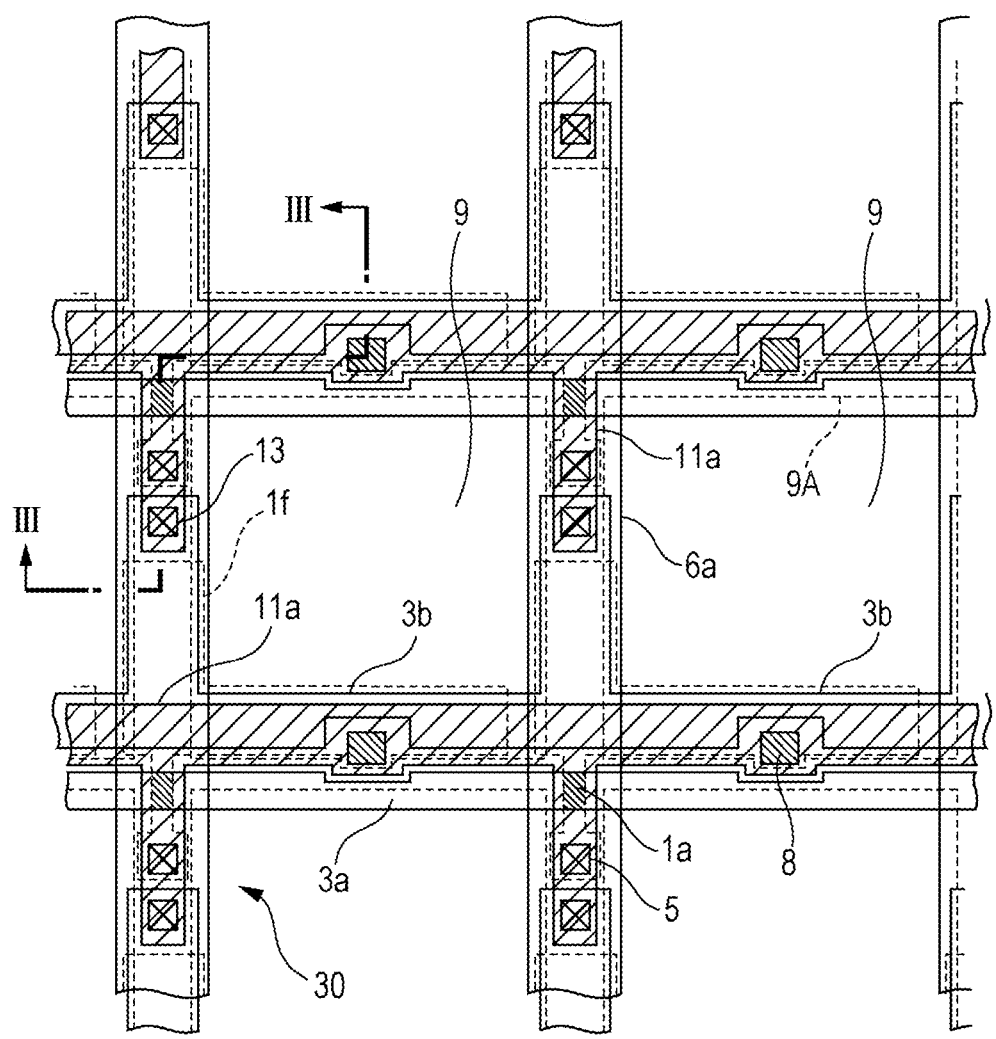
FIG. 2 is a plan view illustrating a configuration of a pixel group of a TFT array substrate that is included in the liquid crystal apparatus illustrated in FIG. 1.
Figure 3:
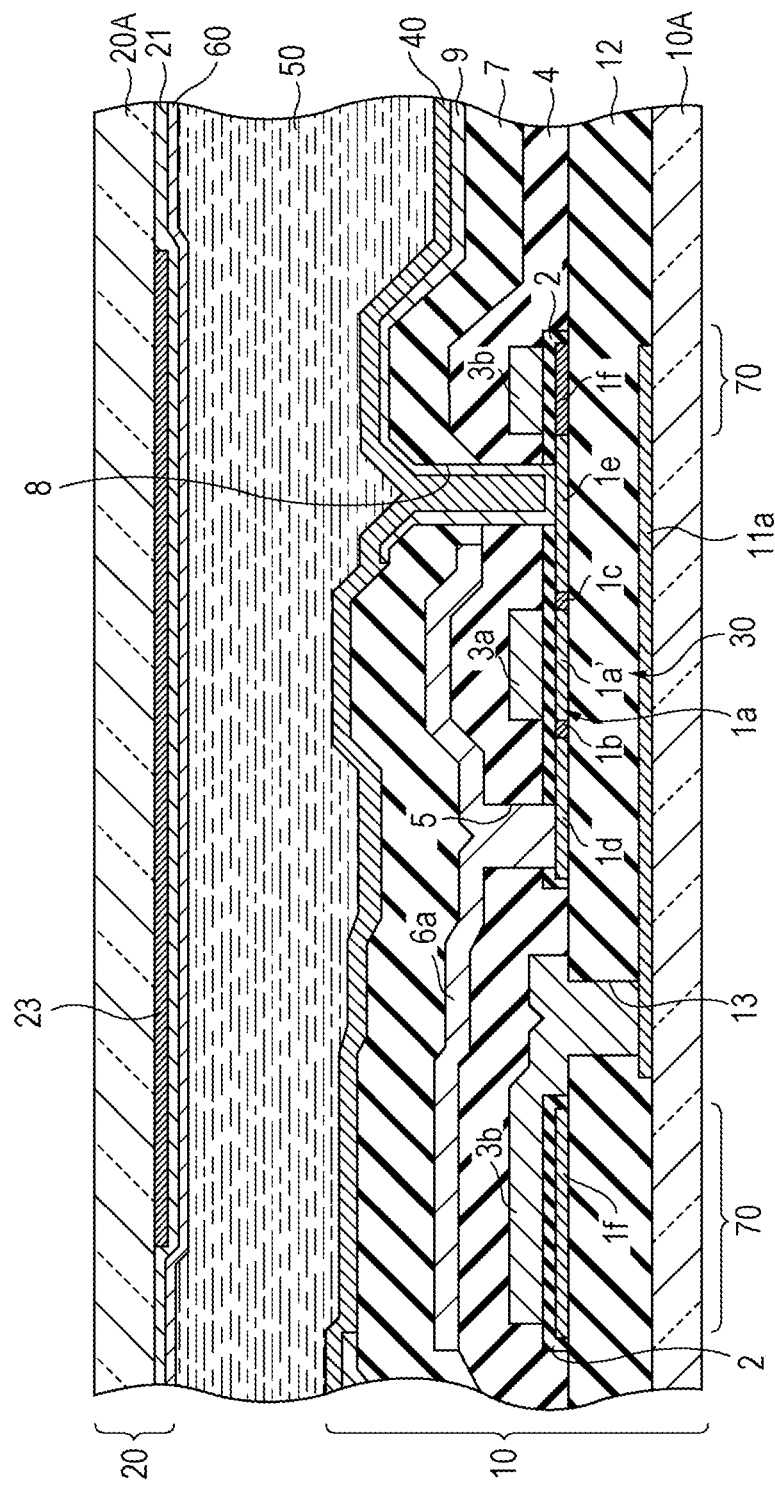
FIG. 3 is a sectional view illustrating the element structure of the liquid crystal apparatus illustrated in FIG. 1.
Figure 4:
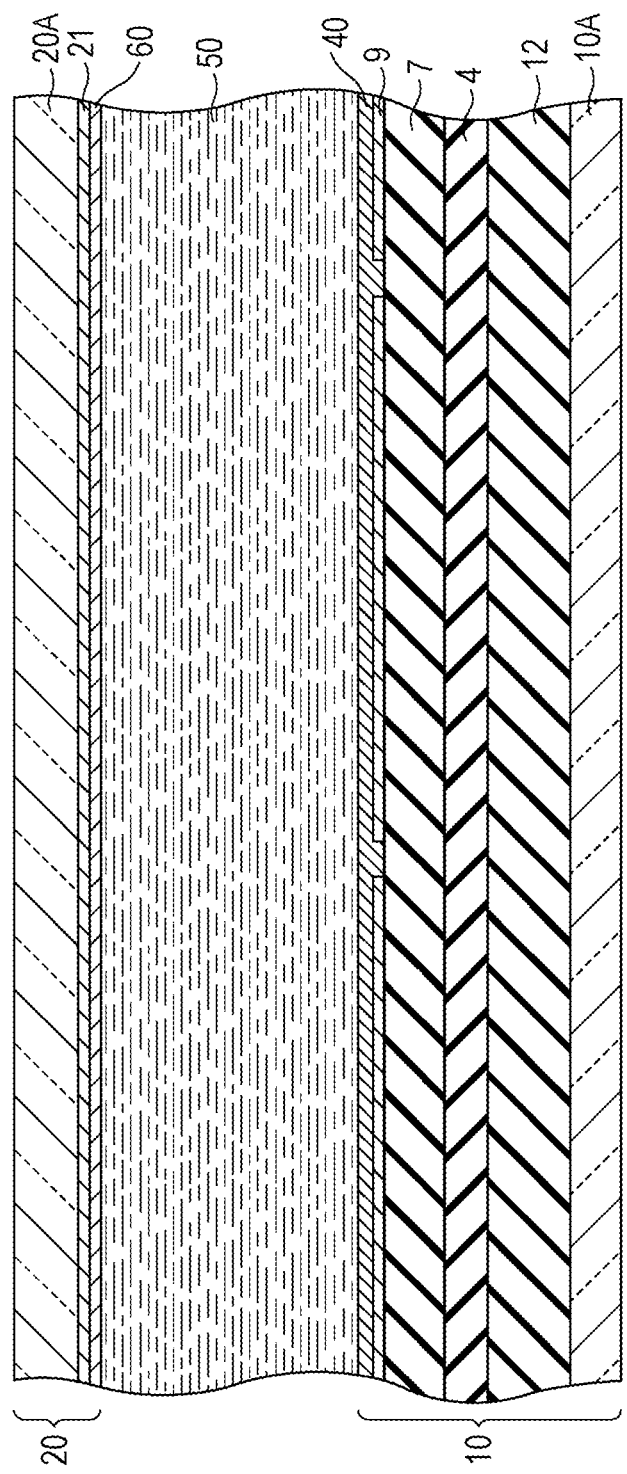
FIG. 4 is a sectional view illustrating a configuration of a pixel region of the liquid crystal apparatus illustrated in FIG. 1.

FIG. 1 is an equivalent circuit diagram of a switching element, a signal line and the like in a plurality of pixels that are arranged in a shape of a matrix configuring an image display region of the transmission type liquid crystal apparatus according to the embodiment. FIG. 2 is a plan view illustrating a structure of a plurality of pixel groups which are adjacent to each other in a TFT array substrate where a data line, a scanning line, a pixel electrode and the like are formed. FIG. 3 is a sectional view of an element region in the transmission type liquid crystal apparatus according to the embodiment, and is a sectional view taken along III-III' line illustrated in FIG. 2. FIG. 4 is a sectional view schematically illustrating a plurality of pixel regions in the transmission type liquid crystal apparatus according to the embodiment. Moreover, FIG. 3 and FIG. 4 illustrate a case where an upper side of the paper is a light incidence side, and a lower side of the paper is a viewing side (observer side). In FIG. 4, some of components such as the switching element are omitted in consideration of visibility in the drawing.

As illustrated in FIG. 1, the transmission type liquid crystal apparatus according to the embodiment includes the plurality of pixels that are arranged in the shape of the matrix configuring the image display region. In each pixel, a pixel electrode 9, and a TFT element 30 as a switching element for performing a conductive control of the pixel electrode 9 are respectively formed. Moreover, a data line 6a to which an image signal is supplied is electrically connected to a source of the TFT element 30. Image signals S1, S2, . . . , Sn which are written in the data line 6a, are sequentially supplied to the line in this order, or are supplied to a plurality of data lines 6a that are adjacent to each other per group.

A scanning line 3a is electrically connected to a gate of the TFT element 30, and regarding a plurality of scanning lines 3a, scanning signals G1, G2, . . . , Gm are sequentially applied to the lines in a pulse manner at a predetermined timing. Moreover, the pixel electrode 9 is electrically connected to a drain of the TFT element 30, and by turning on the TFT element 30 being the switching element only for a certain period, the image signals S1, S2, . . . , Sn which are supplied from the data line 6a are written at a predetermined timing.

The image signals S1, S2, . . . , Sn which are written in a liquid crystal through the pixel electrodes 9, are retained at a predetermined level for a certain period between common electrodes which will be described later. In the liquid crystal, by changing an alignment or an order of a molecular assembly by a level of the applied voltage, the light is modulated, and a gradation display is possible. Here, in order to prevent the retained image signal from leaking, a storage capacitor 70 is added in parallel to a liquid crystal capacitor which is formed between the pixel electrode 9 and the common electrode.

As illustrated in FIG. 2, in the transmission type liquid crystal apparatus according to the embodiment, the plurality of rectangle-shaped pixel electrodes 9 (of which a contour is illustrated by a dotted portion 9A) that are made up of a transparent conductive material such as an indium tin oxide (hereinafter referred to as ITO) are arranged side by side in the matrix shape on the TFT array substrate. Moreover, along each of vertical and horizontal boundaries of each pixel electrode 9, the data line 6a, the scanning line 3a, and a capacitor line 3b are arranged. The embodiment has a structure in which a region where each pixel electrode 9, and the data line 6a, the scanning line 3a, and the capacitor line 3b which are arranged so as to surround each pixel electrode 9 are formed is a pixel, and it is possible to perform the display per pixel arranged in the matrix shape.

The data line 6a configures the TFT element 30, and is electrically connected to a source region which will be described later through a contact hole 5, for example, in a semiconductor layer 1a which is made up of a polysilicon film. In the semiconductor layer 1a, the pixel electrode 9 is electrically connected to a drain region which will be described later through a contact hole 8. Moreover, in the semiconductor layer 1a, the scanning line 3a is arranged so as to face a channel region (region of a left upward oblique line in FIG. 2) which will be described later. The scanning line 3a functions as a gate electrode in a portion facing the channel region.

The capacitor line 3b includes a main line portion (that is, a first region which is formed along the scanning line 3a in a planar view) that is extended in substantially a straight line along the scanning line 3a, and a protrusion portion (that is, a second region which is extended along the data line 6a in the planar view) that protrudes on a front stage side (upward side in FIG. 2) along the data line 6a from a spot intersecting with the data line 6a. Therefore, a plurality of first light-shielding films 11a are arranged in the region indicated by a right upward oblique line in FIG. 2.

As illustrated in FIG. 3 and FIG. 4, in the transmission type liquid crystal apparatus according to the embodiment, a liquid crystal layer 50 is interposed between a TFT array substrate (substrate for the liquid crystal apparatus) 10 and a facing substrate (substrate for the liquid crystal apparatus) 20 arranged to face the TFT array substrate 10. The liquid crystal layer 50 is made up of a liquid crystal of the negative dielectric anisotropy exhibiting that an initial alignment state thereof is a vertical alignment. Furthermore, the transmission type liquid crystal apparatus according to the embodiment is a display apparatus of a vertical alignment mode.

For example, the TFT array substrate 10 is configured of a substrate main body 10A which is made up of a light-transmitting material such as quartz, and the pixel electrode 9 and an alignment layer 40 which are formed on a surface of the liquid crystal layer 50 side as a main component. For example, the facing substrate 20 is configured of a substrate main body 20A which is made up of the light-transmitting material such as glass or quartz, and a common electrode 21 and an alignment layer 60 which are formed on the surface of the liquid crystal layer 50 side as a main component. In the TFT array substrate 10, the pixel electrode 9 is arranged on the surface (inner surface) of the liquid crystal layer 50 side of the substrate main body 10A, and the TFT element 30 for the pixel switching that controls the switching of each pixel electrode 9 is arranged at a position which is adjacent to each pixel electrode 9.

The TFT element 30 for the pixel switching has a lightly doped drain (LDD) structure. Specifically, the scanning line 3a, a channel region 1a' of the semiconductor layer 1a where a channel is formed by an electric field from the scanning line 3a, a gate insulating film 2 that insulates the scanning line 3a and the semiconductor layer 1a, the data line 6a, a low concentration source region 1b and a low concentration drain region 1c of the semiconductor layer 1a, and a high concentration source region 1d and a high concentration drain region 1e of the semiconductor layer 1a are included.

Moreover, a second interlayer insulating film 4 which is open by the contact hole 5 leading to the high concentration source region 1d and the contact hole 8 leading to the high concentration drain region 1e is formed on the substrate main body 10A including the scanning line 3a and the gate insulating film 2. That is, the data line 6a is electrically connected to the high concentration source region 1d through the contact hole 5 penetrating the second interlayer insulating film 4.

Furthermore, a third interlayer insulating film 7 which is open by the contact hole 8 leading to the high concentration drain region 1e is formed on the substrate main body 10A including the data line 6a and the second interlayer insulating film 4. That is, the high concentration drain region 1e is electrically connected to the pixel electrode 9 through the contact hole 8 penetrating the second interlayer insulating film 4 and the third interlayer insulating film 7.

In the embodiment, the gate insulating film 2 is used as a dielectric film by extending the gate insulating film 2 from the position facing the scanning line 3a, a first storage capacitor electrode 1f is made by extending the semiconductor layer 1a, furthermore, a second storage capacitor electrode is made by a portion of the capacitor line 3b facing the gate insulating film 2 and the first storage capacitor electrode 1f, and thereby, the storage capacitor 70 is configured.

Among the surface (inner surface) of the liquid crystal layer 50 side of the substrate main body 10A of the TFT array substrate 10, the first light-shielding film 11a is arranged in the region where the TFT element 30 for each pixel switching is formed. The first light-shielding film 11a prevents the light that is transmitted through the TFT array substrate 10, and is reflected by a lower surface (interface between the TFT array substrate 10 and the air) which is not illustrated in the drawing of the TFT array substrate 10, and is returned to the liquid crystal layer 50 side from entering at least the channel region 1a', the low concentration source region 1b, and the low concentration drain region 1c of the semiconductor layer 1a.

Between the first light-shielding film 11a and the TFT element 30 for the pixel switching, a first interlayer insulating film 12 is formed in order to electrically insulate the semiconductor layer 1a which configures the TFT element 30 for the pixel switching from the first light-shielding film 11a.

Furthermore, in addition to arranging the first light-shielding film 11a in the TFT array substrate 10, the first light-shielding film 11a is configured to be electrically connected to the capacitor line 3b of the front stage or the back stage through a contact hole 13.

Moreover, the alignment layer 40 is formed on the liquid crystal layer 50 side of the TFT array substrate 10, that is, on the pixel electrodes 9 and the third interlayer insulating film 7. The alignment layer 40 controls the alignment of liquid crystal molecules within the liquid crystal layer 50 when the voltage is not applied.

On the other hand, in the facing substrate 20, a second light-shielding film 23 is arranged on the surface (surface) of the liquid crystal layer 50 side of the substrate main body 20A. The second light-shielding film 23 prevents the incident light from invading the channel region 1a', the low concentration source region 1b, and the low concentration drain region 1c of the semiconductor layer 1a of the TFT element 30 for the pixel switching, by covering the region facing the region where the data line 6a, the scanning line 3a, and the TFT element 30 for the pixel switching are formed, that is, the region other than an opening region of each pixel portion.

Furthermore, for example, the common electrode 21 which is made up of ITO is formed throughout substantially the entire surface, on the liquid crystal layer 50 side of the substrate main body 20A where the second light-shielding film 23 is formed. Moreover, the alignment layer 60 is formed on the liquid crystal layer 50 side of the common electrode 21. The alignment layer 60 controls the alignment of the liquid crystal molecules within the liquid crystal layer 50 when the voltage is not applied.

Here, as illustrated in FIG. 5 to FIG. 8, structures of alignment layers 40A to 40D which are included in the liquid crystal apparatuses according to a first embodiment to a fourth embodiment will be described. FIG. 5 to FIG. 8 are sectional views schematically illustrating the structures of the respective alignment layers 40A to 40D. Moreover, enclosure portions X of FIG. 5 to FIG. 8 illustrate a portion of the section by enlarging the portion.

In FIG. 5 to FIG. 8, the alignment layers 40A to 40D which are applicable to the alignment layer 40 side of the TFT array substrate 10 side will be described as an example. In the embodiment, it is possible to apply the same structure to not only the alignment layer 40 of the TFT array substrate 10 side but also the alignment layer 60 of the facing substrate 20 side.

First Embodiment

First, the alignment layer 40A illustrated in FIG. 5 will be described as a first embodiment.

The alignment layer 40A illustrated in FIG. 5 includes an inorganic alignment film 41 that is vaporized and deposited from a direction inclined to the surface where a step is arranged on the surface of the liquid crystal layer 50 side of the TFT array substrate (hereinafter referred to as substrate) 10, a concave portion 46 that has a portion 41a where a thickness of the inorganic alignment film 41 is relatively reduced in the vicinity of the step portion 45, and an organic alignment film 44 that is arranged on an inside of the concave portion 46.

The surface (surface facing the liquid crystal layer 50) where the inorganic alignment film 41 is formed is not equally flat, and for example, various step portions (convex portions) 45 such as a step between a pillar-shaped spacer and the pixel are present. In the embodiment, as a step portion 45, the pillar-shaped spacer is arranged in order to retain the TFT array substrate 10 and the facing substrate 20 in a state of being separated from each other at a predetermined interval.

The inorganic alignment film 41 is made up of an inorganic oxide (inorganic porous film) having a plurality of empty holes 42. For example, it is possible to use $SiO_2$, $SnO_2$, $GeO_2$, $ZrO_2$, $TiO_2$, $Al_2O_3$ or the like as an inorganic oxide. Moreover, the inorganic alignment film 41 is made up of an oblique vapor deposition film of a column structure where the empty hole (gap) 42 is formed between pillar-shaped organizational bodies 43 (hereinafter referred to as column) by using an oblique vapor deposition method. In case where the inorganic oxide film (oblique vapor deposition film) has the column structure, since the column 43 is formed in the state of being inclined, it is possible to vertically align liquid crystal molecules 50a and 50b of the liquid crystal layer 50 by assigning a pre-tilt angle to the liquid crystal molecules 50a and 50b, along the direction where the column 43 is inclined.

In case where the inorganic alignment film 41 is formed, the above-described inorganic oxide is vaporized and deposited from a direction Depo. (hereinafter referred to as vapor deposition direction) illustrated in FIG. 5 that is inclined to the surface on which the step portion 45 is arranged. Therefore, in the portion which becomes a shadow portion of the step portion 45 to the vapor deposition direction Depo., a situation where the inorganic oxide is unlikely to be vaporized and deposited occurs. As a result, the concave portion 46 including the portion (portion where the short column 43a is formed) 41a where the thickness of the inorganic alignment film 41 is relatively reduced, is formed at the position to be in contact with a portion that does not face the inclined direction side of the column structure in a side surface of the step portion 45.

Furthermore, the concave portion 46 includes not only the portion 41a where the thickness of the inorganic alignment film 41 is reduced but also the portion where the inorganic alignment film 41 (column 43a) is not formed in some cases. Moreover, a portion other than the concave portion 46 of the inorganic alignment film 41, is a portion 41b where the inorganic oxide is vapored and deposited with substantially a uniform thickness.

The organic alignment film 44 is made up of an organic silane compound (silane coupling material). The organic silane compound includes alkyl silane molecules, and the alkyl silane molecules are bonded (hydrogen bonding) to the surface (hydroxyl group) of the inorganic alignment film 41 (inorganic oxide), and thereafter, a strong covalent bonding to the surface of the inorganic alignment film 41 (inorganic oxide) is generated through a dehydration condensation reaction. Accordingly, the organic alignment film 44 is formed so as to cover the surface of the inorganic alignment film 41 (column 43), in the state of infiltrating into the inner portion (empty hole 42) of the inorganic alignment film 41.

Figure 5:
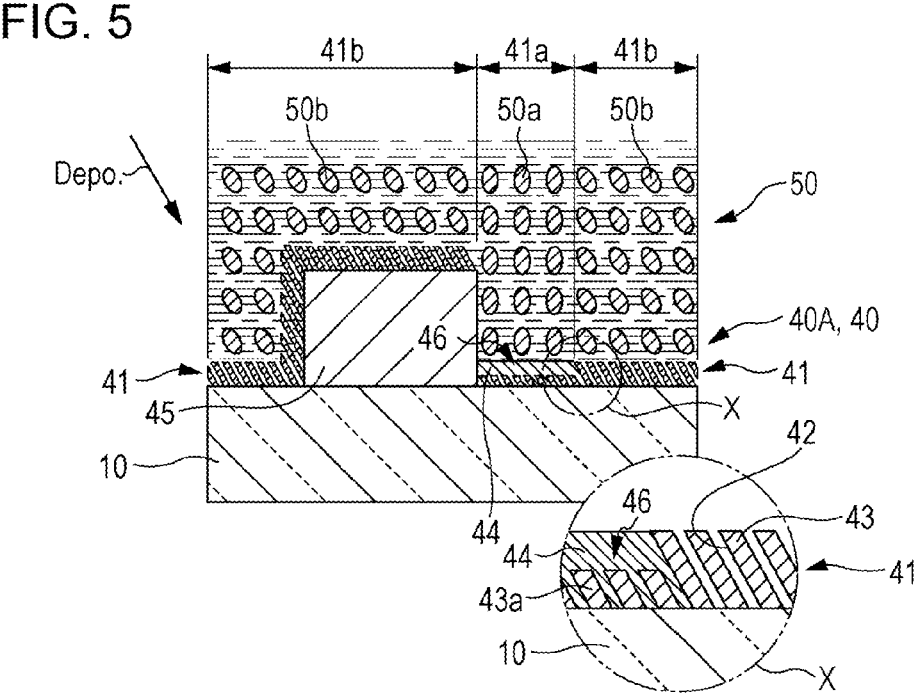
FIG. 5 is a sectional view schematically illustrating a structure of an alignment layer according to a first embodiment or a fifth embodiment.

In the alignment layer 40A illustrated in FIG. 5, on the inside of the concave portion 46, the organic alignment film 44 is arranged with the thickness such that the alignment state which is different from the alignment state of the liquid crystal layer 50 that is allowed by the inorganic alignment film 41 is allowed to the liquid crystal layer 50.

That is, in the alignment layer 40A illustrated in FIG. 5, the thickness of the organic alignment film 44 arranged on the inside of the concave portion 46 is made to be sufficiently thick. Specifically, the thickness of the organic alignment film 44 is increased until the organic alignment film 44 is in the state of being embedded onto the inside of the concave portion 46. More preferably, the organic alignment film 44 has the thickness that becomes a height (flush surface) of the same degree as the portion 41b other than the concave portion 46 of the inorganic alignment film 41.

Accordingly, in the alignment layer 40A illustrated in FIG. 5, on the surface other than the concave portion 46, the alignment state of the liquid crystal layer 50 that is allowed by the portion 41b of the inorganic alignment film 41 becomes the vertical alignment in which the pre-tilt angle is assigned to the liquid crystal molecule 50b of the liquid crystal layer 50. On the other hand, on the inside of the concave portion 46, the alignment state of the liquid crystal layer 50 that is allowed by the organic alignment film 44 becomes the vertical alignment in which the pre-tilt angle is not assigned to the liquid crystal molecule 50a of the liquid crystal layer 50.

In this case, since the initial alignment state of the liquid crystal layer 50 that is allowed by the alignment layer 40A illustrated in FIG. 5 becomes the vertical alignment, for example, it is possible to suppress degradation of display quality such as light leakage (black floating). Moreover, it is possible to suppress disclination that is caused by a case where an alignment direction becomes unstable.

As described above, in the liquid crystal apparatus according to the embodiment, since the alignment state of the liquid crystal layer 50 is stabilized by the alignment layer 40A illustrated in FIG. 5, it is possible to obtain excellent moisture-proof properties and alignment stability while achieving further improvement of a light resistance lifespan.

Second Embodiment

Next, the alignment layer 40B illustrated in FIG. 6 will be described as a second embodiment.

In the following description, in the same portions as those of the alignment layer 40A illustrated in FIG. 5, the description thereof will be omitted, and the same reference signs are attached thereto in the drawing.

Figure 6:
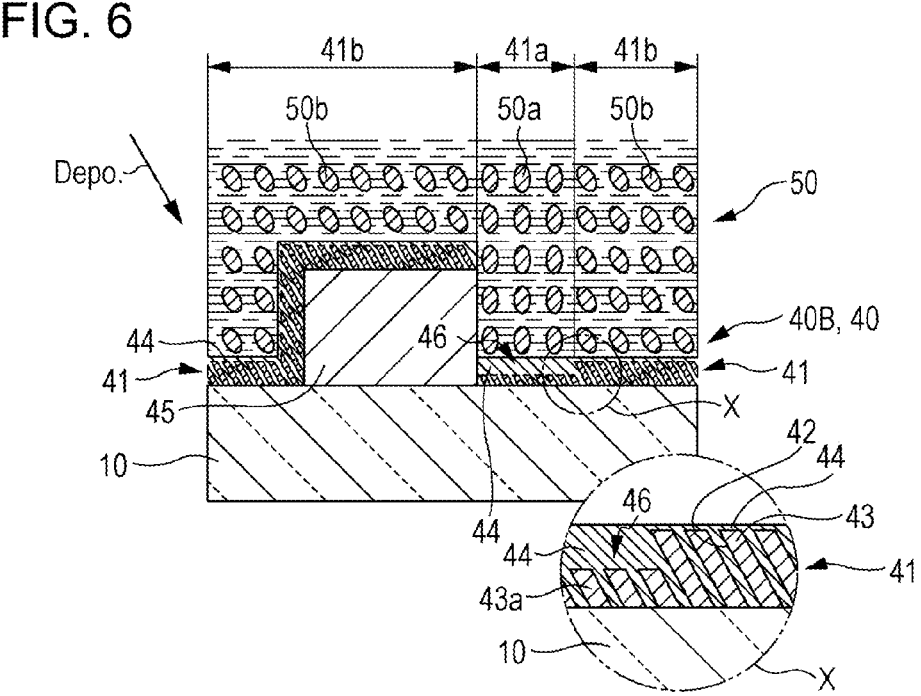
FIG. 6 is a sectional view schematically illustrating a structure of an alignment layer according to a second embodiment or a sixth embodiment.

The alignment layer 40B illustrated in FIG. 6 has a configuration in which the organic alignment film 44 is arranged throughout the entire surface of the inorganic alignment film 41, in addition to the configuration of the alignment layer 40A illustrated in FIG. 5. Specifically, in the alignment layer 40B illustrated in FIG. 6, on the surface other than the concave portion 46, the organic alignment film 44 is arranged by the thickness allowing the liquid crystal layer 50 to have the alignment state that is the same as the alignment state of the liquid crystal layer 50 which is allowed by the inorganic alignment film 41.

That is, in the alignment layer 40B illustrated in FIG. 6, the thickness of the organic alignment film 44 arranged on the surface other than the concave portion 46 is made to be sufficiently thin. Specifically, in the portion 41b other than the concave portion 46 of the inorganic alignment film 41, the thickness of the organic alignment film 44 is decreased as the degree of covering the surface of the column 43 while maintaining the alignment which is formed by the column 43. Otherwise, the alignment layer 40B illustrated in FIG. 6 has the configuration which is the same as that of the alignment layer 40A illustrated in FIG. 5.

Accordingly, in the alignment layer 40B illustrated in FIG. 6, on the surface other than the concave portion 46, the alignment state of the liquid crystal layer 50 that is allowed by the portion 41b of the inorganic alignment film 41 which is covered with the organic alignment film 44 becomes the vertical alignment in which the pre-tilt angle is assigned to the liquid crystal molecule 50b of the liquid crystal layer 50. On the other hand, on the inside of the concave portion 46, the alignment state of the liquid crystal layer 50 that is allowed by the organic alignment film 44 becomes the vertical alignment in which the pre-tilt angle is not assigned to the liquid crystal molecule 50a of the liquid crystal layer 50.

In this case, since the initial alignment state of the liquid crystal layer 50 that is allowed by the alignment layer 40B illustrated in FIG. 6 becomes the vertical alignment, for example, it is possible to suppress the degradation of the display quality such as light leakage (black floating). Moreover, it is possible to suppress the disclination that is caused by the case where the alignment direction becomes unstable.

As described above, in the liquid crystal apparatus according to the embodiment, since the alignment state of the liquid crystal layer 50 is stabilized by the alignment layer 40B illustrated in FIG. 6, it is possible to obtain excellent moisture-proof properties and alignment stability while achieving further improvement of the light resistance lifespan.

Third Embodiment

Next, the alignment layer 40C illustrated in FIG. 7 will be described as a third embodiment.

In the following description, in the same portions as those of the alignment layer 40A illustrated in FIG. 5, the description thereof will be omitted, and the same reference signs are attached thereto in the drawing.

In the alignment layer 40C illustrated in FIG. 7, on the inside of the concave portion 46, the organic alignment film 44 is arranged by the thickness allowing the liquid crystal layer 50 to have the alignment state that is the same as the alignment state of the liquid crystal layer 50 which is allowed by the inorganic alignment film 41.

That is, in the alignment layer 40C illustrated in FIG. 7, the thickness of the organic alignment film 44 arranged on the inside of the concave portion 46 is made to be sufficiently thin. Specifically, in the portion 41a where the thickness of the inorganic alignment film 41 is relatively reduced, the thickness of the organic alignment film 44 is decreased as the degree of covering the surface of the column 43 while maintaining the alignment which is formed by the column 43. Otherwise, the alignment layer 40C illustrated in FIG. 7 has the configuration which is the same as that of the alignment layer 40A illustrated in FIG. 5.

Accordingly, in the alignment layer 40C illustrated in FIG. 7, on the surface other than the concave portion 46, the alignment state of the liquid crystal layer 50 that is allowed by the portion 41b of the inorganic alignment film 41 becomes the vertical alignment in which the pre-tilt angle is assigned to the liquid crystal molecule 50b of the liquid crystal layer 50. On the other hand, on the inside of the concave portion 46, the alignment state of the liquid crystal layer 50 that is allowed by the portion 41a of the inorganic alignment film 41 which is covered with the organic alignment film 44 becomes the vertical alignment in which the pre-tilt angle is assigned to the liquid crystal molecule 50a of the liquid crystal layer 50.

In this case, since the initial alignment state of the liquid crystal layer 50 that is allowed by the alignment layer 40C illustrated in FIG. 7 becomes the vertical alignment, for example, it is possible to suppress the degradation of the display quality such as light leakage (black floating). Moreover, it is possible to suppress the disclination that is caused by the case where the alignment direction becomes unstable. Furthermore, for example, in case where the pre-tilt angle of the liquid crystal molecule 50b is set to 4°, if a pre-tilt angle within a range of ±10% of the pre-tilt angle of the liquid crystal molecule 50b is assigned to the liquid crystal molecule 50a, it is possible to suppress in-plane uniformity of black transmittance within ±10%.

As described above, in the liquid crystal apparatus according to the embodiment, since the alignment state of the liquid crystal layer 50 is stabilized by the alignment layer 40C illustrated in FIG. 7, it is possible to obtain excellent moisture-proof properties and alignment stability while achieving further improvement of the light resistance lifespan.

Fourth Embodiment

Next, the alignment layer 40D illustrated in FIG. 8 will be described as a fourth embodiment.

In the following description, in the same portions as those of the alignment layer 40C illustrated in FIG. 7, the description thereof will be omitted, and the same reference signs are attached thereto in the drawing.

The alignment layer 40D illustrated in FIG. 8 has a configuration in which the organic alignment film 44 is arranged throughout the entire surface of the inorganic alignment film 41, in addition to the configuration of the alignment layer 40C illustrated in FIG. 7. Specifically, in the alignment layer 40D illustrated in FIG. 8, on the surface other than the concave portion 46, the organic alignment film 44 is arranged by the thickness allowing the liquid crystal layer 50 to have the alignment state that is the same as the alignment state of the liquid crystal layer 50 which is allowed by the inorganic alignment film 41.

That is, in the alignment layer 40D illustrated in FIG. 8, the thickness of the organic alignment film 44 arranged on the surface other than the concave portion 46 is made to be sufficiently thin. Specifically, in the portion 41b other than the concave portion 46 of the inorganic alignment film 41, the thickness of the organic alignment film 44 is decreased as the degree of covering the surface of the column 43 while maintaining the alignment which is formed by the column 43. Otherwise, the alignment layer 40D illustrated in FIG. 8 has the configuration which is the same as that of the alignment layer 40C illustrated in FIG. 7.

Accordingly, in the alignment layer 40D illustrated in FIG. 8, on the surface other than the concave portion 46, the alignment state of the liquid crystal layer 50 that is allowed by the portion 41b of the inorganic alignment film 41 which is covered with the organic alignment film 44 becomes the vertical alignment in which the pre-tilt angle is assigned to the liquid crystal molecule 50b of the liquid crystal layer 50. On the other hand, on the inside of the concave portion 46, the alignment state of the liquid crystal layer 50 that is allowed by the portion 41a of the inorganic alignment film 41 which is covered with the organic alignment film 44 becomes the vertical alignment in which the pre-tilt angle is assigned to the liquid crystal molecule 50a of the liquid crystal layer 50.

In this case, since the initial alignment state of the liquid crystal layer 50 that is allowed by the alignment layer 40D illustrated in FIG. 8 becomes the vertical alignment, for example, it is possible to suppress the degradation of the display quality such as light leakage (black floating). Moreover, it is possible to suppress the disclination that is caused by the case where the alignment direction becomes unstable. Furthermore, for example, in case where the pre-tilt angle of the liquid crystal molecule 50b is set to 4°, if a pre-tilt angle within the range of ±10% of the pre-tilt angle of the liquid crystal molecule 50b is assigned to the liquid crystal molecule 50a, it is possible to suppress in-plane uniformity of the black transmittance within ±10%.

As described above, in the liquid crystal apparatus according to the embodiment, since the alignment state of the liquid crystal layer 50 is stabilized by the alignment layer 40D illustrated in FIG. 8, it is possible to obtain excellent moisture-proof properties and alignment stability while achieving further improvement of the light resistance lifespan.

Method for Manufacturing Liquid Crystal Apparatus

Next, a method for manufacturing the liquid crystal apparatus according to one embodiment will be described.

When the liquid crystal apparatus according to the embodiment is manufactured, first, the TFT array substrate 10 is manufactured. Specifically, the light-transmitting substrate main body 10A which is made up of glass or the like is prepared, and the first light-shielding film 11a, the first interlayer insulating film 12, the semiconductor layer 1a, various types of the wirings 3a, 3b and 6a, the insulating films 4 and 7, the pixel electrode 9 and the like are formed by a known method on the surface of the substrate main body 10A. Subsequently, the alignment layer 40 is formed on the third interlayer insulating film 7 including the pixel electrode 9, and the TFT array substrate 10 is obtained.

Next, separately from the TFT array substrate 10 described above, the facing substrate 20 is manufactured. Specifically, after the light-transmitting substrate main body 20A which is made up of glass or the like is prepared, the second light-shielding film 23 and the common electrode 21 are formed on the surface of the substrate main body 20A, by using the same method as that of the case where the TFT array substrate 10 is manufactured, and the alignment layer 60 is formed by using the same method as that of the case where the alignment layer 40 is formed, and the facing substrate 20 is obtained.

Next, the TFT array substrate 10 and the facing substrate 20 are stuck together through a sealing agent. Furthermore, after a liquid crystal panel is made by injecting the liquid crystal of which dielectric anisotropy is negative from a liquid crystal injection port that is formed in the sealing agent, a predetermined wiring is connected thereto. Accordingly, it is possible to manufacture the liquid crystal apparatus according to the embodiment.

Here, as methods for manufacturing the liquid crystal apparatus according to a fifth embodiment to an eighth embodiment, the methods for manufacturing the liquid crystal apparatuses including the alignment layers 40A to 40D illustrated in FIG. 5 to FIG. 8 will be described. In the methods for manufacturing the liquid crystal apparatus according to the fifth embodiment to the eighth embodiment, except that methods for forming the alignment layers 40A to 40D illustrated in FIG. 5 to FIG. 8 are different from each other, it is possible to manufacture the respective liquid crystal apparatuses through the common manufacturing processes described above. Consequently, in the fifth embodiment to the eighth embodiment, the methods for forming the alignment layers 40A to 40D illustrated in FIG. 5 to FIG. 8 will be described.

Fifth Embodiment

In the fifth embodiment, when the alignment layer 40A illustrated in FIG. 5 is formed, a process of forming the inorganic alignment film 41 by vaporizing and depositing the inorganic oxide from the direction inclined to the surface on which the step portion 45 is arranged, and a process of forming the organic alignment film 44 on the inside of the concave portion 46 including the portion 41a where the thickness of the inorganic alignment film 41 is relatively reduced in the vicinity of the step portion 45 are included.

Moreover, when the alignment layer 40A illustrated in FIG. 5 is formed, on the inside of the concave portion 46, the organic alignment film 44 is arranged by the thickness allowing the liquid crystal layer 50 to have the alignment state that is different from the alignment state of the liquid crystal layer 50 which is allowed by the inorganic alignment film 41.

That is, when the alignment layer 40A illustrated in FIG. 5 is formed, the thickness of the organic alignment film 44 which is formed on the inside of the concave portion 46 is made to be sufficiently thick. Specifically, the thickness of the organic alignment film 44 is increased until the organic alignment film 44 is in the state of being embedded onto the inside of the concave portion 46. More preferably, the organic alignment film 44 has the thickness that becomes the height (flush surface) of the same degree as the portion 41b other than the concave portion 46 of the inorganic alignment film 41.

As a method (liquid phase method) for forming the organic alignment film 44 on only the inside of the concave portion 46, it is possible to use a method for locally applying a coating liquid containing the organic silane compound onto the inside of the concave portion 46, for example, by using an ink jet method. Moreover, it is possible to use the method for locally applying the coating liquid containing the organic silane compound onto the inside of the concave portion 46, by using a screen printing method. Additionally, after a mask having an opening is formed at a position responding to the concave portion 46, it is possible to use the method for locally applying the coating liquid containing the organic silane compound onto the inside of the concave portion 46, by a spin coating method.

After the coating liquid is locally applied onto the inside of the concave portion 46, a coating film which is formed on the inside of the concave portion 46 is burned. Thereafter, cleaning and drying of the substrate 10 are performed. Accordingly, it is possible to form the organic alignment film 44 on only the inside of the concave portion 46.

Moreover, as a method (gas phase method) for forming the organic alignment film 44 on only the inside of the concave portion 46, for example, it is possible to use a method for vaporizing and depositing the organic silane compound, after the mask having the opening is formed at the position responding to the concave portion 46. Specifically, within a heated chamber of a CVD apparatus, the organic silane compound that is gasified from a container which the liquid-shaped organic silane compound enters is vaporized and deposited (fixed). Accordingly, it is possible to form the organic alignment film 44 on only the inside of the concave portion 46.

As a method for increasing the thickness of the organic alignment film 44 which is formed on the inside of the concave portion 46, it is possible to use a method for increasing an amount of the coating liquid which is applied onto the inside of the concave portion 46 at a time. Moreover, it is possible to use a method for repeatedly performing the applying and the baking of the coating liquid. It is possible to use a method for partially irradiating the inside of the concave portion 46 with ultraviolet rays (UV light), increasing silanol groups of the portion 41*a* where the thickness of the inorganic alignment film 41 is relatively reduced, and bonding the organic silane compounds much. Additionally, it is possible to use the method for bonding the organic silane compounds more by using the liquid phase method or the gas phase method described above, while accelerating the dehydration condensation reaction by applying an acid solution onto the inside of the concave portion 46.

As described above, in the method for manufacturing the liquid crystal apparatus according to the embodiment, by forming the alignment layer 40A illustrated in FIG. 5, it is possible to obtain the liquid crystal apparatus which is excellent in moisture-proof properties and alignment stability while achieving further improvement of the light resistance lifespan.

Sixth Embodiment

In a sixth embodiment, when the alignment layer 40B illustrated in FIG. 6 is formed, the process of forming the inorganic alignment film 41 by vaporizing and depositing the inorganic oxide from the direction inclined to the surface on which the step portion 45 is arranged, and a process of forming the organic alignment film 44 throughout the entire surface of the inorganic alignment film 41 are included.

Moreover, when the alignment layer 40B illustrated in FIG. 6 is formed, on the inside of the concave portion 46, the organic alignment film 44 is formed by the thickness allowing the liquid crystal layer 50 to have the alignment state that is different from the alignment state of the liquid crystal layer 50 which is allowed by the inorganic alignment film 41. On the other hand, on the surface other than the concave portion 46, the organic alignment film 44 is formed by the thickness allowing the liquid crystal layer 50 to have the alignment state that is the same as the alignment state of the liquid crystal layer 50 which is allowed by the inorganic alignment film 41.

That is, when the alignment layer 40B illustrated in FIG. 6 is formed, the thickness of the organic alignment film 44 which is formed on the inside of the concave portion 46 is made to be sufficiently thick. Meanwhile, the thickness of the organic alignment film 44 which is formed on the surface other than the concave portion 46 is made to be sufficiently thin. Specifically, the thickness of the organic alignment film 44 is increased until the organic alignment film 44 is in the state of being embedded onto the inside of the concave portion 46. More preferably, the organic alignment film 44 has the thickness that becomes the height (flush surface) of the same degree as the portion 41*b* other than the concave portion 46 of the inorganic alignment film 41. On the other hand, in the portion 41*b* other than the concave portion 46 of the inorganic alignment film 41, the thickness of the organic alignment film 44 is decreased as the degree of covering the surface of the column 43 while maintaining the alignment which is formed by the column 43.

As such a method (liquid phase method) for forming the organic alignment film 44, it is possible to use a method for applying the coating liquid containing the organic silane compound between the inside of the concave portion 46 and the surface other than the concave portion 46 by changing the applied amount of the coating liquid, for example, by using an ink jet method, a dip coating method, a spin coating method or the like. In particular, by using a case where the coating liquid falls down (so to speak, drips) on the inside of the concave portion 46 from the side surface of the step portion 45, it is possible to apply the coating liquid more onto the inside of the concave portion 46.

After the coating liquid is applied throughout the entire surface of the inorganic alignment film 41, the coating film which is formed by the coating liquid is burned. Thereafter, the cleaning and the drying of the substrate 10 are performed. Accordingly, it is possible to form the organic alignment film 44 throughout the entire surface of the inorganic alignment film 41. Moreover, it is possible to increase the thickness of the organic alignment film 44 which is formed on the inside of the concave portion 46 in comparison with the thickness of the organic alignment film 44 which is formed on the surface other than the concave portion 46.

As described above, in the method for manufacturing the liquid crystal apparatus according to the embodiment, by forming the alignment layer 40B illustrated in FIG. 6, it is possible to obtain the liquid crystal apparatus which is excellent in moisture-proof properties and alignment stability while achieving further improvement of the light resistance lifespan.

Seventh Embodiment

In a seventh embodiment, when the alignment layer 40C illustrated in FIG. 7 is formed, the process of forming the inorganic alignment film 41 by vaporizing and depositing the inorganic oxide from the direction inclined to the surface on which the step portion 45 is arranged, and the process of forming the organic alignment film 44 on the inside of the concave portion 46 including the portion 41*a* where the thickness of the inorganic alignment film 41 is relatively reduced in the vicinity of the step portion 45 are included.

Moreover, when the alignment layer 40C illustrated in FIG. 7 is formed, on the inside of the concave portion 46, the organic alignment film 44 is formed by the thickness allowing the liquid crystal layer 50 to have the alignment state that is the same as the alignment state of the liquid crystal layer 50 which is allowed by the inorganic alignment film 41.

That is, when the alignment layer 40C illustrated in FIG. 7 is formed, the thickness of the organic alignment film 44 which is formed on the inside of the concave portion 46 is made to be sufficiently thin. Specifically, in the portion 41a where the thickness of the inorganic alignment film 41 is relatively reduced, the thickness of the organic alignment film 44 is decreased as the degree of covering the surface of the column 43 while maintaining the alignment which is formed by the column 43.

As a method (liquid phase method and gas phase method) for forming the organic alignment film 44 on only the inside of the concave portion 46, it is possible to use the same method as that of the case where the alignment layer 40A illustrated in FIG. 5 is formed.

As described above, in the method for manufacturing the liquid crystal apparatus according to the embodiment, by forming the alignment layer 40C illustrated in FIG. 7, it is possible to obtain the liquid crystal apparatus which is excellent in moisture-proof properties and alignment stability while achieving further improvement of the light resistance lifespan.

Eighth Embodiment

In the eighth embodiment, when the alignment layer 40D illustrated in FIG. 8 is formed, the process of forming the inorganic alignment film 41 by vaporizing and depositing the inorganic oxide from the direction inclined to the surface on which the step portion 45 is arranged, and the process of forming the organic alignment film 44 throughout the entire surface of the inorganic alignment film 41 are included.

Moreover, when the alignment layer 40D illustrated in FIG. 8 is formed, on the inside of the concave portion 46 and the surface other than the concave portion 46, the organic alignment film 44 is formed by the thickness allowing the liquid crystal layer 50 to have the alignment state that is the same as the alignment state of the liquid crystal layer 50 which is allowed by the inorganic alignment film 41.

That is, when the alignment layer 40D illustrated in FIG. 8, the thickness of the organic alignment film 44 which is formed on the inside of the concave portion 46 and the surface other than the concave portion 46 is made to be sufficiently thin. Specifically, in the portion 41a where the thickness of the inorganic alignment film 41 is reduced and the portion 41b other than the concave portion 46 of the inorganic alignment film 41, the thickness of the organic alignment film 44 is decreased as the degree of covering the surface of the column 43 while maintaining the alignment which is formed by the column 43.

As a method (liquid phase method and gas phase method) for forming the organic alignment film 44 on the inside of the concave portion 46 and the surface other than the concave portion 46, it is possible to use the same method as that of the case where the alignment layer 40A illustrated in FIG. 5 is formed.

As described above, in the method for manufacturing the liquid crystal apparatus according to the embodiment, by forming the alignment layer 40D illustrated in FIG. 8, it is possible to obtain the liquid crystal apparatus which is excellent in moisture-proof properties and alignment stability while achieving further improvement of the light resistance lifespan.

The disclosure is not necessarily limited to the above embodiments, and various modifications may be added in the scope without departing from the gist of the disclosure.

For example, in the embodiment, only the active matrix type liquid crystal apparatus using the TFT element is described, but the disclosure is not limited thereto. For example, some embodiments may be applied to an active matrix type liquid crystal apparatus using a thin-film diode (TFD) element, a passive matrix type liquid crystal apparatus or the like. Moreover, in the embodiment, only the transmission matrix type liquid crystal apparatus is described, but the disclosure is not limited thereto, and may be applied to a reflection type liquid crystal apparatus or a semi-transmitting reflection type liquid crystal apparatus. In this manner, some embodiments may be applied to a liquid crystal apparatus of any structure.

Electronic Apparatus

Next, an example of an electronic apparatus including the liquid crystal apparatus according to the above embodiment will be described.

Figure 9A:
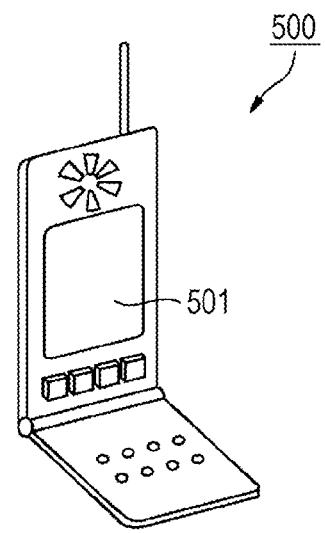
FIG. 9A, FIG. 9B and FIG. 9C are perspective views illustrating an example of an electronic apparatus according to one embodiment.

FIG. 9A is a perspective view illustrating an example of a mobile phone. The mobile phone illustrated in FIG. 9A includes a mobile phone main body 500, and the mobile phone main body 500 includes a liquid crystal display portion 501 using the liquid crystal apparatus according to the above embodiment.

Figure 9B:
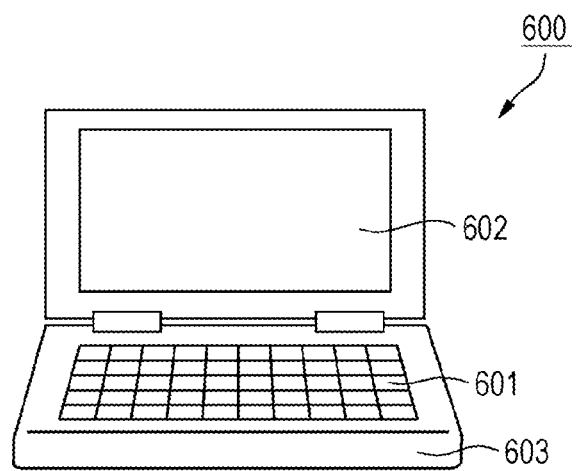

FIG. 9B is a perspective view illustrating an example of a portable information processing apparatus 600 such as a word processor or a personal computer. As illustrated in FIG. 9B, the information processing apparatus 600 includes an input portion 601 such as a keyboard, and an information processing apparatus main body 603 that has a liquid crystal display portion 602 using the liquid crystal apparatus according to the above embodiment.

Figure 9C:
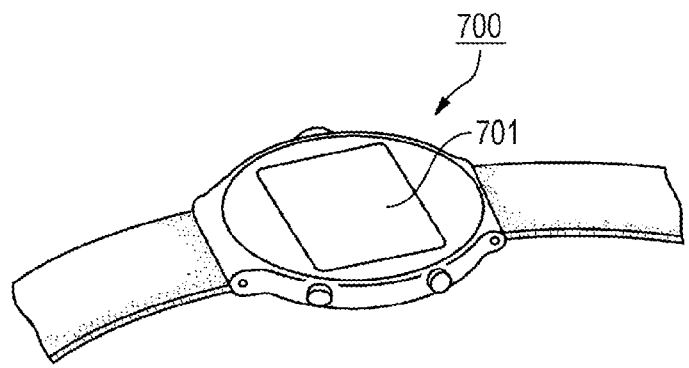

FIG. 9C is a perspective view illustrating an example of a wrist watch. The wrist watch illustrated in FIG. 9C includes a watch main body 700, and the watch main body 700 includes a liquid crystal display portion 701 using the liquid crystal apparatus according to the above embodiment.

As described above, in the respective electronic apparatuses illustrated in FIG. 9A to FIG. 9C, since the liquid crystal apparatus according to the above embodiment is applied to the display portion, it is possible to suppress the occurrence of the burn-in, and maintain the display quality for a long period.

For example, the liquid crystal apparatus according to the above embodiment may be suitably used to an electronic apparatus such as a digital signage (electronic signboard) or a projector (projection type liquid crystal display apparatus) in which the improvement of the light resistance lifespan is desired, in addition to the electronic apparatuses illustrated in FIG. 9A to FIG. 9C. Moreover, it is possible to suitably use the embodiment to a liquid crystal device such as a liquid crystal lens, an optical pick-up element using the liquid crystal lens or the like.

Projection Type Liquid Crystal Display Apparatus

Next, a configuration of the projection type liquid crystal display apparatus (projector) including the liquid crystal apparatus according to the above embodiment as a light-modulating unit will be described with reference to FIG. 10.

Figure 10:
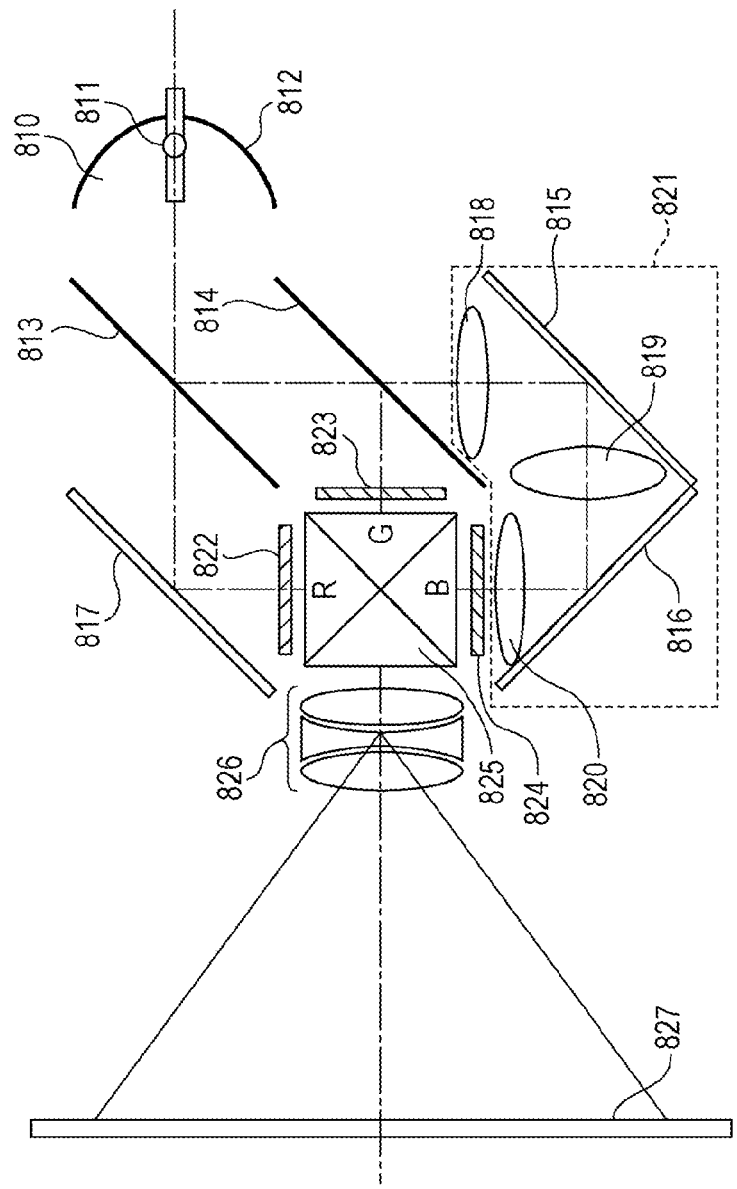
FIG. 10 is a schematic view illustrating an example of a projection type liquid crystal display apparatus according to one embodiment.

FIG. 10 is a schematic configuration diagram illustrating a main portion of the projection type liquid crystal display apparatus using the liquid crystal apparatus according to the above embodiment as a light-modulating apparatus.

The projection type liquid crystal display apparatus illustrated in FIG. 10 includes a light source 810, dichroic mirrors 813 and 814, reflecting mirrors 815, 816 and 817, an incidence lens 818, a relay lens 819, an emission lens 820, liquid crystal light-modulating apparatuses 822, 823 and 824, a cross dichroic prism 825, and a projection lens 826.

The light source 810 is configured by a lamp 811 of a metal halide or the like, and a reflector 812 that reflects the light of the lamp. The dichroic mirror 813 of blue light and green light reflection transmits red light among light beams from the light source 810, and reflects blue light and green light. The transmitted red light is reflected by the reflecting mirror 817, and is incident to the red light liquid crystal light-modulating apparatus 822 including the liquid crystal apparatus according to the above embodiment.

On the other hand, the green light among the color light beams which are reflected by the dichroic mirror 813 is reflected by the dichroic mirror 814 of green light reflection, and is incident to the green light liquid crystal light-modulating apparatus 823 including the liquid crystal apparatus as one example of the embodiment described above. Furthermore, the blue light is also transmitted through the second dichroic mirror 814. Regarding the blue light, in order to compensate for an optical path length of the blue light which is different from that of the green light or the red light, a light-guiding unit 821 that is configured by a relay lens system including the incidence lens 818, the relay lens 819, and the emission lens 820 is arranged, and the blue light is incident to the blue light liquid crystal light-modulating apparatus 824 including the liquid crystal apparatus as one example of the embodiment described above, through the light-guiding unit 821.

Three types of color lights which are modulated by the respective light-modulating apparatuses are incident to the cross dichroic prism 825. In the prism, four right-angled prisms are stuck together, and a dielectric multilayer film for reflecting the red light, and a dielectric multilayer film for reflecting the blue light are formed into a cross shape on the inner surface thereof. Three types of color lights are composed by the dielectric multilayer films, and the light indicating a color image is formed. The composed light is projected on a screen 827 by the projection lens 826 being a projection optical system, and the image is displayed by being enlarged.

In the projection type liquid crystal display apparatus having the structure as described above, by applying the liquid crystal apparatus according to the above embodiment to the liquid crystal light-modulating apparatuses 822, 823 and 824, it is possible to suppress the occurrence of the burn-in, and maintain the display quality for a long period.

The entire disclosure of Japanese Patent Application No. 2015-081651, filed Apr. 13, 2015 is expressly incorporated by reference herein.

What is claimed is:

1. A liquid crystal apparatus comprising:
a substrate that includes a convex portion on one surface;
a liquid crystal layer that is arranged on the one surface side of the substrate;
an inorganic alignment film that is arranged between the substrate and the liquid crystal layer, and has a column structure inclined to the one surface of the substrate; and
an organic alignment film,
wherein the inorganic alignment film has a concave portion of which a thickness becomes thin in at least a portion of the column structure, the concave portion is arranged at a position to be in contact with a portion that does not face an inclined direction side of the column structure in a side surface of the convex portion, and
the organic alignment film is arranged in the concave portion.

2. The liquid crystal apparatus according to claim 1, wherein a thickness of the organic alignment film is a thickness such that an alignment state of the liquid crystal layer at the concave portion becomes an alignment state that is different from the alignment state of the liquid crystal layer at a position which is different from the concave portion.

3. The liquid crystal apparatus according to claim 1, wherein a thickness of the organic alignment film is a thickness such that an alignment state of the liquid crystal layer at the concave portion becomes an alignment state that is the same as the alignment state of the liquid crystal layer at a position which is different from the concave portion.

4. The liquid crystal apparatus according to claim 3, wherein the organic alignment film has a portion arranged in the concave portion, and a portion arranged in a position which is different from the concave portion.

5. The liquid crystal apparatus according to claim 1, wherein the organic alignment film is an organic silane compound.

6. An electronic apparatus comprising:
the liquid crystal apparatus according to claim 1.

7. A liquid crystal apparatus comprising:
a substrate that includes a convex portion on one surface;
a liquid crystal layer that is arranged on the one surface side of the substrate;
an inorganic alignment film that is arranged between the substrate and the liquid crystal layer, and has a column structure inclined to the one surface of the substrate; and
an organic alignment film,
wherein the inorganic alignment film has a concave portion of which a thickness becomes thin in at least a portion of the column structure, the concave portion is arranged at a position to be in contact with a surface where the column structure is not formed in a side surface of the convex portion, and
the organic alignment film is arranged in the concave portion.

8. The liquid crystal apparatus according to claim 7, wherein a thickness of the organic alignment film is a thickness such that an alignment state of the liquid crystal layer at the concave portion becomes an alignment state that is different from the alignment state of the liquid crystal layer at a position which is different from the concave portion.

9. The liquid crystal apparatus according to claim 7, wherein a thickness of the organic alignment film is a thickness such that an alignment state of the liquid crystal layer at the concave portion becomes an alignment state that is the same as the alignment state of the liquid crystal layer at a position which is different from the concave portion.

10. The liquid crystal apparatus according to claim 9, wherein the organic alignment film has a portion arranged in the concave portion, and a portion arranged in a position which is different from the concave portion.

11. The liquid crystal apparatus according to claim 7, wherein the organic alignment film is an organic silane compound.

12. A liquid crystal apparatus comprising:
a substrate that includes a convex portion on one surface;
a liquid crystal layer that is arranged on the one surface side of the substrate;
an inorganic alignment film that is arranged between the substrate and the liquid crystal layer, and has a column structure inclined to the one surface of the substrate; and
an organic alignment film,
wherein the inorganic alignment film has a concave portion of which a thickness becomes thin in at least a portion of the column structure in the vicinity of the convex portion, and
the organic alignment film is arranged in the concave portion.

13. An electronic apparatus comprising:
the liquid crystal apparatus according to claim 7.

14. The liquid crystal apparatus according to claim 12, wherein a thickness of the organic alignment film is a thickness such that an alignment state of the liquid crystal layer at the concave portion becomes an alignment state that is different from the alignment state of the liquid crystal layer at a position which is different from the concave portion.

15. The liquid crystal apparatus according to claim 12, wherein a thickness of the organic alignment film is a thickness such that an alignment state of the liquid crystal layer at the concave portion becomes an alignment state that is the same as the alignment state of the liquid crystal layer at a position which is different from the concave portion.

16. The liquid crystal apparatus according to claim 15, wherein the organic alignment film has a portion arranged in the concave portion, and a portion arranged in a position which is different from the concave portion.

17. The liquid crystal apparatus according to claim 12, wherein the organic alignment film is an organic silane compound.

18. An electronic apparatus comprising:
the liquid crystal apparatus according to claim 12.

* * * * *